(12) United States Patent
Sohmshetty et al.

(10) Patent No.: US 12,008,784 B2
(45) Date of Patent: Jun. 11, 2024

(54) SYSTEMS AND METHODS FOR IMAGE-BASED ELECTRICAL CONNECTOR ASSEMBLY DETECTION

(71) Applicant: Ford Global Technologies, LLC, Dearborn, MI (US)

(72) Inventors: Raj Sohmshetty, Canton, MI (US); Vikas Rajendra, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 279 days.

(21) Appl. No.: 17/171,100

(22) Filed: Feb. 9, 2021

(65) Prior Publication Data

US 2022/0254055 A1  Aug. 11, 2022

(51) Int. Cl.
*G06K 9/00* (2022.01)
*G06T 7/00* (2017.01)
*G06T 7/11* (2017.01)
*G06T 7/13* (2017.01)
*G06T 7/73* (2017.01)

(52) U.S. Cl.
CPC .............. *G06T 7/73* (2017.01); *G06T 7/0002* (2013.01); *G06T 7/11* (2017.01); *G06T 7/13* (2017.01); *G06T 2207/20081* (2013.01); *G06T 2207/20084* (2013.01); *G06T 2207/30108* (2013.01)

(58) Field of Classification Search
CPC ......... G06T 7/0002; G06T 2207/30108; G06T 7/0004; G06T 7/73; G06T 7/11; G06T 7/13; G06T 2207/20081; G06T 2207/20084; G06T 7/70; G06T 7/0006; G06T 7/001; G06N 3/08
See application file for complete search history.

(56) References Cited

U.S. PATENT DOCUMENTS

| 9,852,500 B2 * | 12/2017 | Rourke ................. G06T 7/0006 |
| 10,167,983 B2 | 1/2019 | Tomlinson |
| 11,171,459 B2 * | 11/2021 | Hoffmann .............. H01R 43/20 |
| 2019/0016264 A1 * | 1/2019 | Potnis ....................... G06T 7/75 |

(Continued)

FOREIGN PATENT DOCUMENTS

| CN | 105371888 | 3/2016 |
| WO | WO2022108509 | * 11/2020 |

(Continued)

OTHER PUBLICATIONS

Rosebrock, "Measuring distance between objects in an image with OpenCV", Apr. 4, 2016, https://pyimagesearch.com/2016/04/04/measuring-distance-between-objects-in-an-image-with-opencv/ (Year: 2016).*

(Continued)

*Primary Examiner* — Emily C Terrell
*Assistant Examiner* — Owais Iqbal Memon
(74) *Attorney, Agent, or Firm* — Burris Law, PLLC

(57) ABSTRACT

A method includes defining, in an image, bounding boxes about an electrical connector assembly, identifying an edge of each of the bounding boxes, and determining one or more metrics based on the edge of each the bounding boxes, where the one or more metrics indicate a positional relationship between the edges of the bounding boxes. The method includes determining a state of the electrical connector assembly based on the one or more metrics and transmitting a notification based on the state.

17 Claims, 3 Drawing Sheets

(56) References Cited

U.S. PATENT DOCUMENTS

2020/0130582 A1* 4/2020 Wong ................ B62D 13/06
2021/0053407 A1* 2/2021 Smith ................ B60D 1/64

FOREIGN PATENT DOCUMENTS

WO     WO2022108509      * 11/2020   ............... G06K 9/62
WO     WO-2022108509 A1 * 11/2020   ............... G06K 9/62

OTHER PUBLICATIONS

Cassimiroetal. Detectionofdefectsinthemanufacturingofelectricmotorstatorsusingvisionsystems: Electricalconnectors, Nov. 2016 (Year:2016) (Year: 2016).*

Rosebrock, "MeasuringdistancebetweenobjectsinanimagewithOpenCV", Apr. 4, 2016, https://oyimagesearch.com/2016/04/04/measuring-distance-between-objects-in-an-image-with-opencv/(Year:2016) (Year: 2016).*

Cassimiro et al. "Detection of defects in the manufacturing of electric motor stators using vision systems:Electrical connectors", Nov. 2016 (Year: 2016).*

Rosebrock, "Measuring distance between objects in an image with Open Cv" Apr. 4, 2016, https://oyimagesearch.com/2016/04/04/measuring-distance-between-objects-in-an-image-with-opencv/ (Year: 2016).*

O'Dell, Vision Automates Aerospace Connector Pin Inspection, Vision Spectra, pp. 1-6, Nov. 23, 2020.

* cited by examiner

SYSTEMS AND METHODS FOR IMAGE-BASED ELECTRICAL CONNECTOR ASSEMBLY DETECTION

FIELD

The present disclosure relates to a system and/or method for image-based electrical connector assembly detection.

BACKGROUND

The statements in this section merely provide background information related to the present disclosure and may not constitute prior art.

In a manufacturing environment, object detection is utilized to perform automated assembly tasks. As an example, a control system may perform a machine-learning routine to detect an electrical connector assembly, determine a connection state of the electrical connector assembly, and perform a corrective action based on the connection state. However, machine-learning routines may require large amounts of training data to properly train the control system to accurately perform the machine-learning routines.

These issues associated with machine-learning routines performed by control systems, among other issues, are addressed by the present disclosure.

SUMMARY

This section provides a general summary of the disclosure and is not a comprehensive disclosure of its full scope or all of its features.

The present disclosure provides a method including defining, in an image, bounding boxes about an electrical connector assembly, identifying an edge of each of the bounding boxes, and determining one or more metrics based on the edge of each the bounding boxes, where the one or more metrics indicate a positional relationship between the edges of the bounding boxes. The method includes determining a state of the electrical connector assembly based on the one or more metrics and transmitting a notification based on the state.

In some forms, the bounding boxes include a first component bounding box and a second component bounding box, the first component bounding box is associated with a first component of the electrical connector assembly, and the second component bounding box represents a second component of the electrical connector assembly.

In some forms, the first component bounding box and the second component bounding boxes are rotated bounding boxes.

In some forms, the edge of each of the bounding boxes includes a first adjacent edge of the first component bounding box and a second adjacent edge of the second component bounding box.

In some forms, the one or more metrics include a distance between the first adjacent edge and the second adjacent edge.

In some forms, the state is a connected state in response to the distance between the first adjacent edge and the second adjacent edge being less than a threshold distance.

In some forms, the state is an unconnected state in response to the distance between the first adjacent edge and the second adjacent edge being greater than a threshold distance.

In some forms, the one or more metrics include an angle defined between the first adjacent edge and the second adjacent edge.

In some forms, the state is a connected state in response to the angle defined between the first adjacent edge and the second adjacent edge being less than a threshold angle.

In some forms, the state is an unconnected state in response to the angle defined between the first adjacent edge and the second adjacent edge being greater than a threshold angle.

The present disclosure provides a system including a processor and a nontransitory computer-readable medium including instructions that are executable by the processor. The instructions include defining, in an image, bounding boxes about an electrical connector assembly, identifying an edge of each bounding box, and determining one or more bounding box metrics based on the edge of each bounding box, where the one or more bounding box metrics include a distance between each edge, an angle between each edge, or a combination thereof. The instructions include determining a connection state of the electrical connector assembly based on the one or more bounding box metrics and transmitting a notification based on the connection state.

In some forms, the bounding boxes include a first component bounding box and a second component bounding box, the first component bounding box is associated with a first component of the electrical connector assembly, and the second component bounding box represents a second component of the electrical connector assembly.

In some forms, the edge of each of the bounding boxes includes a first adjacent edge of the first component bounding box and a second adjacent edge of the second component bounding box.

In some forms, the distance between each edge is further based on a distance between the first adjacent edge and the second adjacent edge.

In some forms, the angle between each edge is further based on an angle defined between the first adjacent edge and the second adjacent edge.

The present disclosure provides a method including generating a first component bounding box and a second component bounding box of an image representing an electrical connector assembly, identifying a first adjacent edge of the first component bounding box and a second adjacent edge of the second component bounding box, and determining one or more metrics based on the first adjacent edge and the second adjacent edge, wherein the one or more metrics include a distance between the first adjacent edge and the second adjacent edge, an angle defined between the first adjacent edge and the second adjacent edge, or a combination thereof. The method includes determining a state of the electrical connector assembly based on the one or more metrics and transmitting a notification based on the state.

In some forms, the state is a connected state in response to the distance between the first adjacent edge and the second adjacent edge being less than a threshold distance, the angle defined between the first adjacent edge and the second adjacent edge being less than a threshold angle, or a combination thereof.

In some forms, the state is an unconnected state in response to the distance between the first adjacent edge and the second adjacent edge being greater than a threshold distance, the angle defined between the first adjacent edge and the second adjacent edge being greater than a threshold angle, or a combination thereof.

In some forms, the first component bounding box and the second component bounding box are generated using a deep learning computing system.

In some forms, the first component bounding box and the second component bounding box are generated using a region-based convolutional neural network.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1A:
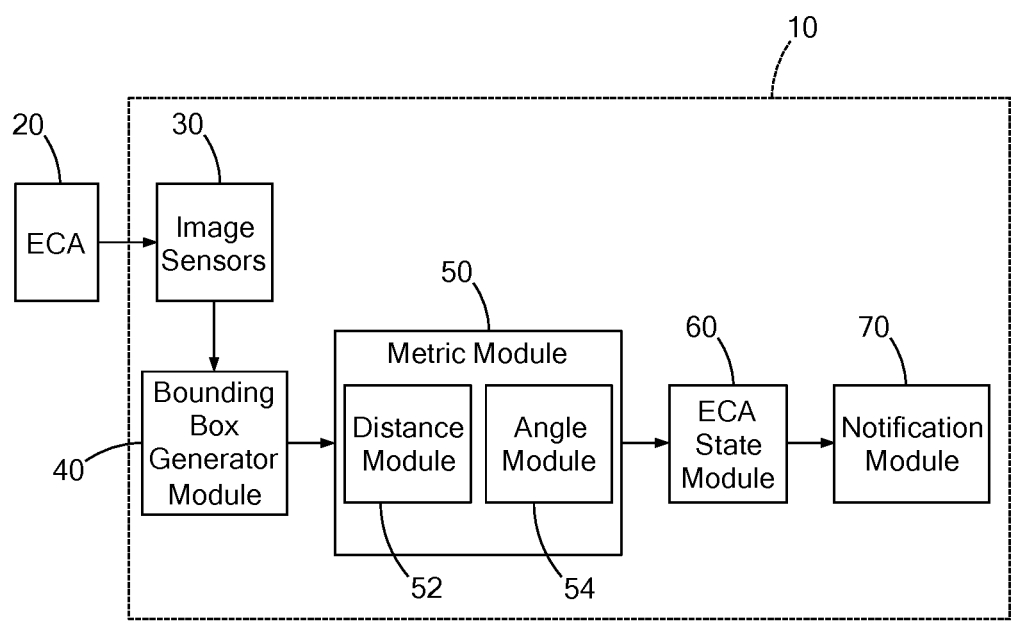
FIG. 1A illustrates a functional block diagram of a control system for inspecting an electrical connector assembly in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides a control system that is configured to determine the quality of an electrical connector assembly connection. More particularly, the control system includes a deep learning neural network that defines bounding boxes surrounding various components of the electrical connector assembly (e.g., male and female portions of the electrical connector assembly). Furthermore, the control system is configured to determine the quality of the electrical connector assembly based on a positional relationship between the edges of the bounding boxes, such as a distance and/or angle defined between the edges of the bounding boxes. As such, the deep learning neural network is trained for detecting the various portions of the electrical connector assembly and does not need to be trained for detecting defects. Accordingly, by performing the routines described herein, the control system accurately determines the quality of an electrical connector assembly connection, reduces the number of iterations needed to train the deep learning neural network, and reduces the computing resources needed to determine the quality of an electrical connector assembly connection. It should be readily understood that the control system of the present disclosure addresses other issues and should not be limited to the examples provided herein.

Referring to FIG. 1A, a control system 10 for testing an electrical connector assembly (ECA) 20 of a component (e.g., a vehicle) is provided. The control system 10 generally includes image sensors 30, a bounding box generator module (BBGM) 40, a metric module 50, an ECA state module 60, and a notification module 70. While the modules of the control system 10 are illustrated as part of the control system 10, it should be understood that the modules may be positioned at the same location or distributed at different locations (e.g., at one or more edge computing devices) and communicably coupled accordingly. In one form, the modules of the control system 10 are communicably coupled using a wired and/or wireless communication protocol (e.g., a Bluetooth®-type protocol, a cellular protocol, a wireless fidelity (Wi-Fi)-type protocol, a near-field communication (NFC) protocol, an ultra-wideband (UWB) protocol, among others).

In one form, the image sensors 30 provide image data of the ECA 20 to the BBGM 40 and include, but are not limited to: a two-dimensional (2D) camera, a 3D camera, a stereo vision camera, an infrared sensor, a radar scanner, a laser scanner, a light detection and ranging (LIDAR) sensor, and/or an ultrasonic sensor.

Figure 1B:
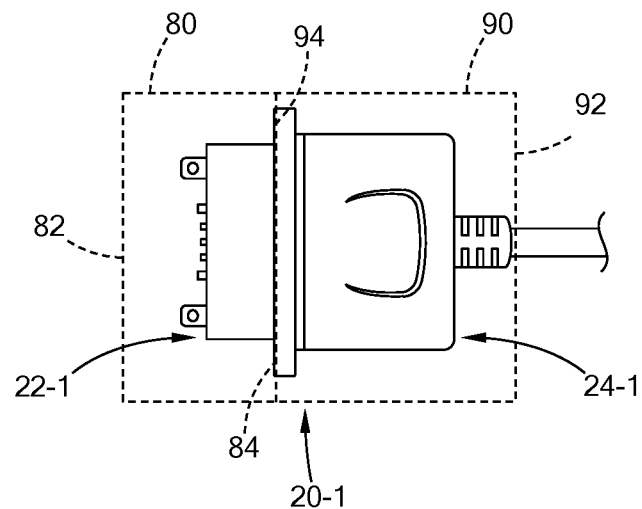
FIG. 1B illustrates a schematic view of an electrical connector assembly in accordance with the teachings of the present disclosure.

As an example and referring to FIG. 1B, the image sensors 30 may provide an image 75 of an ECA 20-1 having a male portion 22-1 and a female portion 24-1 provided in in a connected state. As another example and referring to FIG. 1C, the image sensors 30 may provide an image 150 of an ECA 20-2 having a male portion 22-2 and a female portion 24-2 in an unconnected state. In the following, operation of the control system 10 is described in reference to the examples of FIGS. 1B and 1C.

In one form, the BBGM 40 is configured to define bounding boxes (e.g., rotated bounding boxes) that surround various components of the ECA 20 and identify one or more edges of each of the bounding boxes. As an example, the BBGM 40 is implemented by a deep learning computing system, such as a deep learning neural network, that is configured to generate rotated bounding boxes of male and female portions of the ECA 20 and identify one or more edges thereof by performing known semantic segmentation routines and bounding box generation routines.

In one form, the BBGM 40 is implemented by a region-based convolutional neural network (R-CNN), such as a Mask R-CNN, a Faster R-CNN, among others. More specifically, in one form, the BBGM 40 is a Mask R-CNN that includes a convolutional layer configured to perform a convolution routine on the images to generate a plurality of feature maps. Furthermore, the Mask R-CNN may include a region proposal network (RPN) layer that is configured to generate one or more regions of interest (ROIs) from the feature map and thereby define the rotated bounding boxes of the male and female portions of the ECA 20. Additionally, the Mask R-CNN may include an ROI pooling layer that is configured to reduce the width and/or length of the feature maps generated by the convolution layer. It should be understood that the BBGM 40 may be implemented by any neural network or computing systems configured to define the bounding boxes surrounding various components of the ECA 20 and is not limited to the computing systems described herein.

As an example, referring to FIG. 1B, the BBGM 40 defines a rotated bounding box 80 about the male portion 22-1 of the ECA 20-1 and a rotated bounding box 90 about the female portion 24-1 of the ECA 20-1. Similarly, in the example of FIG. 1C, the BBGM 40 defines a rotated bounding box 100 about the male portion 22-2 of the ECA 20-2 and a rotated bounding box 110 about the female portion 24-2 of the ECA 20-2.

Figure 1C:
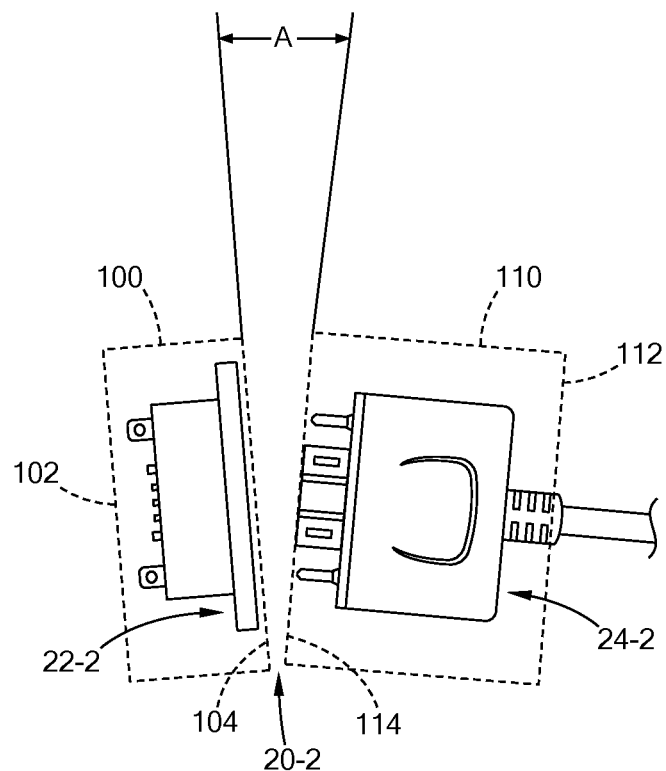
FIG. 1C illustrates another schematic view of an electrical connector assembly in accordance with the teachings of the present disclosure.

In one form, the BBGM 40 is further configured to identify adjacent edges of the bounding boxes. As used herein, "adjacent edges" refer to an edge of a bounding box that is nearest to another bounding box. For instance, in the example of FIG. 1B, the BBGM 40 identifies edge 84 as the adjacent edge of the rotated bounding box 80, as the edge 84 is the nearest to the rotated bounding box 90. Furthermore, the BBGM 40 may identify edge 94 as the adjacent edge of the rotated bounding box 90, as it is the nearest to the rotated bounding box 80. In the example of FIG. 1C, the BBGM 40 identifies edge 104 as the adjacent edge of the rotated bounding box 100, as the edge 104 is nearest to the rotated bounding box 110. Furthermore, the BBGM 40 may identify edge 114 as the adjacent edge of the rotated bounding box 110, as it is the nearest to the rotated bounding box 100.

In one form, the BBGM 40 is configured to identify distal edges of the bounding boxes. As used herein, "distal edges" refer to an edge of a bounding box that is furthest from another bounding box. More particularly, in the example of FIG. 1B, the BBGM 40 identifies edge 82 as the distal edge of rotated bounding box 80 since the edge 82 is the furthest from rotated bounding box 90. In addition, the BBGM 40 may identify edge 92 as the distal edge of the rotated bounding box 90 since it is furthest from the rotated bounding box 80. With regard to the example of FIG. 1C, the BBGM 40 identifies edge 102 as the distal edge of rotated bounding box 100 since the edge 102 is the furthest from rotated bounding box 110 and identifies edge 112 as the distal edge of the rotated bounding box 110 since it is the furthest from the rotated bounding box 100.

While the BBGM 40 is described as being configured to identify one adjacent/distal edge of the bounding boxes, it should be understood that the BBGM 40 may identify more than one adjacent/distal edge or other edge types in other variations. As an example, if the BBGM 40 defines three bounding boxes representing three components of the ECA 20, the BBGM 40 may identify one or two separate adjacent/distal edges for each bounding box.

With continuing reference to FIG. 1A, in one form, the metric module 50 includes a distance module 52 and an angle module 54 configured to determine one or more metrics based on the identified edges of the bounding boxes (e.g., the distal edges and/or the adjacent edges). The one or more metrics indicate a positional relationship between the edges of the bounding boxes. In one form, the metric module 50 may perform known image processing routines (e.g., a difference-based image processing routine, a semantic-based image processing routine, pixel conversion routines, among others) on the image data of the ECA 20 to determine the one or metrics, as described below in further detail.

In one form, the distance module 52 is configured to determine a distance between one or more pairs of the identified edges. For instance, referring to FIG. 1B, the distance module 52 determines that a distance between the adjacent edges 84 and 94 of rotated bounding boxes 80 and 90 is approximately zero. In the example of FIG. 1C, the distance module 52 may determine that a distance between adjacent edges 104, 114 of rotated bounding boxes 100 and 110) is "D." While the distance is shown as a distance between the midpoints of the edges 104, 114, it should be understood that the distance may be based on other points of the edges 104, 114 in other forms. Furthermore, the distance module 52 may perform similar distance measurements based on the identified distal edges in some forms. In one variation, the distance module 52 may perform similar distance measurements between one of the adjacent edges of one rotated bounding box and one of the distal edges of another rotated bounding box.

In one form, the angle module 54 is configured to determine an angle defined between one or more pairs of the identified edges. For instance, with regard to FIG. 1B, the angle module 54 determines that an angle defined between the edges 84 and 94 is approximately zero. In the example of FIG. 1C, the angle module 54 determines that an angle defined between edges 104 and 114 is "A." Furthermore, the angle module 54 may perform similar angle measurements based on the distal edges in some forms.

In one form, the ECA state module 60 is configured to determine a state of the ECA 20 based on the one or more metrics determined by the metric module 50. As an example, the ECA state module 60 determines the ECA 20 is in an unconnected state in response to the distance between a pair of edges (e.g., pair of adjacent edge and/or pair of distal edges) being greater than a threshold connection distance and/or the angle defined between the pair of edges being greater than a threshold connection angle. As another example, the ECA state module 60 determines the ECA 20 is in a connected state in response to the distance being less than the threshold connection distance and/or the angle being less than the threshold connection angle.

In addition to or in lieu of determining connected and unconnected stated, the ECA state module 60 may determine if the ECA 20 is in a partially connected state. For example, the ECA state module 60 determines that the ECA 20 is in a partially connected state in response to the distance between the pair of edges being less than the threshold connection distance and greater than a threshold partial connection distance. The ECA state module 60 may also determine the ECA 20 is in a partially connected state in response to the angle defined between the pair of edges being less than the threshold connection angle and greater than a threshold partial connection angle.

In one form, the notification module 70 is configured to generate a notification representing the state of the ECA 20 (e.g., a visual and/or auditory alert if the ECA 20 is in the unconnected state, partially unconnected state, or the connected state). In one form, the notification module 70 is configured to transmit the notification to a human machine interface (HMI) (e.g., a display device, a laptop, a smartphone, among others) and/or remote computing system such that the notification can be displayed and/or broadcasted.

Figure 2:
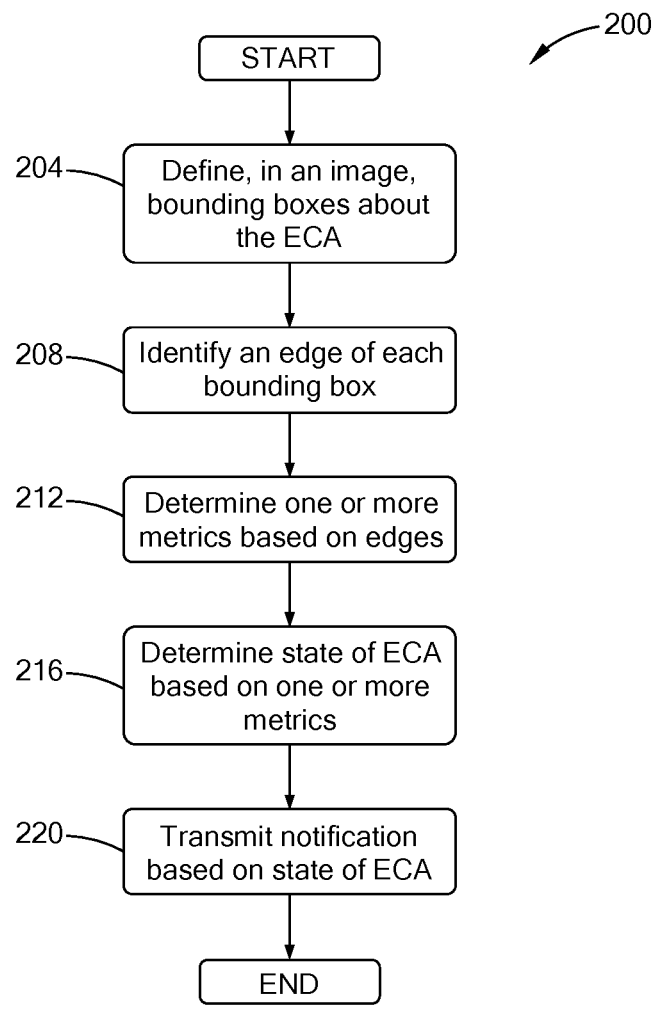
FIG. 2 illustrates an example control routine in accordance with the teachings of the present disclosure.

With reference to FIG. 2, a routine 200 for determining the connection state of the ECA 20 is shown and is performed by the control system 10. At 204, the control system 10 defines, in an image of the ECA 20, bounding boxes about the ECA 20. At 208, the control system 10 identifies an edge (e.g., an adjacent edge) of each of the bounding boxes. At 212, the control system 10 determines one or more metrics based on the identified edges of the bounding boxes. As an example, the control system 10 determines a distance and/or an angle between the adjacent edges of the bounding boxes.

At 216, the control system 10 determines the state of the ECA 20 based on the one or more metrics. As an example, the control system 10 determines the ECA 20 is in an unconnected state when the distance between the adjacent edges is greater than a threshold distance or the angle defined between the adjacent edges is greater than a threshold angle. As another example, the control system 10 determines the ECA 20 is in a connected state when the distance between the adjacent edges is less than a threshold distance and the angle defined between the adjacent edges is less than a threshold angle. At 220, the control system 10 transmits a notification based on the state of the ECA 20 (e.g., a visual alert indicating the ECA 20 is in a connected state or an unconnected state), and the routine then ends.

While the routine 200 describes determining the connection state of the ECA 20, it should be understood that the routine 200 may be iteratively performed for any number of ECAs 20.

Accordingly, by using a deep learning neural network and/or a R-CNN to define bounding boxes surrounding various components of the electrical connector assembly, the control system may determine the quality of the electrical connector assembly based on a positional relationship between the edges of the bounding boxes. As such, the deep learning neural network and/or a R-CNN only is trained for detecting the various portions of the electrical connector assembly and does not need to be trained for detecting defects. Therefore, by performing the routines described herein, the control system accurately determines the quality of an electrical connector assembly connection, reduces the number of iterations needed to train the deep learning neural network, and reduces the computing resources needed to determine the quality of an electrical connector assembly connection.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality, such as, but not limited to, movement drivers and systems, transceivers, routers, input/output interface hardware, among others; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

What is claimed is:

1. A method comprising:
   defining, in an image and by a convolutional neural network, bounding boxes about an electrical connector assembly, wherein the bounding boxes include a first component bounding box and a second component bounding box, wherein the first component bounding box is associated with a first component of the electrical connector assembly, and wherein the second component bounding box is associated with a second component of the electrical connector assembly;
   identifying an edge of each of the bounding boxes;
   determining a distance and an angle between on the edge of each of the bounding boxes, wherein the distance and the angle between the edge of each of the bounding boxes define a positional relationship between the edges of the bounding boxes;
   determining a state of the electrical connector assembly based on the positional relationship; and
   transmitting a notification based on the state.

2. The method of claim 1, wherein the first component bounding box and the second component bounding boxes are rotated bounding boxes.

3. The method of claim 1, wherein the edge of each of the bounding boxes includes a first adjacent edge of the first component bounding box and a second adjacent edge of the second component bounding box.

4. The method of claim 3, wherein the distance is a distance between the first adjacent edge and the second adjacent edge.

5. The method of claim 4, wherein the state is a connected state in response to the distance between the first adjacent edge and the second adjacent edge being less than a threshold distance.

6. The method of claim 4, wherein the state is an unconnected state in response to the distance between the first adjacent edge and the second adjacent edge being greater than a threshold distance.

7. The method of claim 3, wherein the angle is defined between the first adjacent edge and the second adjacent edge.

8. The method of claim 7, wherein the state is a connected state in response to the angle defined between the first adjacent edge and the second adjacent edge being less than a threshold angle.

9. The method of claim 7, wherein the state is an unconnected state in response to the angle defined between the first adjacent edge and the second adjacent edge being greater than a threshold angle.

10. A system comprising:
a processor; and
a nontransitory computer-readable medium including instructions that are executable by the processor, wherein the instructions include:
defining, in an image and by a convolutional neural network, bounding boxes about an electrical connector assembly, wherein the bounding boxes include a first component bounding box and a second component bounding box, wherein the first component bounding box is associated with a first component of the electrical connector assembly, and wherein the second component bounding box is associated with a second component of the electrical connector assembly;
identifying an edge of each bounding box;
determining a distance and an angle between the edge of each bounding box, wherein the distance and the angle between each edge of each bounding box define a positional relationship between each edge of each bounding box;
determining a connection state of the electrical connector assembly based on the positional relationship; and
transmitting a notification based on the connection state.

11. The system of claim 10, wherein the edge of each of the bounding boxes includes a first adjacent edge of the first component bounding box and a second adjacent edge of the second component bounding box.

12. The system of claim 11, wherein the distance between each edge is further based on a distance between the first adjacent edge and the second adjacent edge.

13. The system of claim 11, wherein the angle between each edge is further based on an angle defined between the first adjacent edge and the second adjacent edge.

14. A method comprising:
defining, in an image and by a convolutional neural network, a first component bounding box and a second component bounding box about an electrical connector assembly, wherein the first component bounding box is associated with a first component of the electrical connector assembly, and the second component bounding box is associated with a second component of the electrical connector assembly;
identifying a first adjacent edge of the first component bounding box and a second adjacent edge of the second component bounding box;
determining a distance and an angle between the first adjacent edge and the second adjacent edge, wherein the distance and the angle between the first adjacent edge and the second adjacent edge define a positional relationship between the first adjacent edge and the second adjacent edge;
determining a state of the electrical connector assembly based on the positional relationship; and
transmitting a notification based on the state.

15. The method of claim 14, wherein the state is a connected state in response to the distance between the first adjacent edge and the second adjacent edge being less than a threshold distance, the angle defined between the first adjacent edge and the second adjacent edge being less than a threshold angle, or a combination thereof.

16. The method of claim 14, wherein the state is an unconnected state in response to the distance between the first adjacent edge and the second adjacent edge being greater than a threshold distance, the angle defined between the first adjacent edge and the second adjacent edge being greater than a threshold angle, or a combination thereof.

17. The method of claim 14, wherein the neutral network is a region-based convolutional neural network.

* * * * *